Patented May 30, 1933

1,911,551

UNITED STATES PATENT OFFICE

CLARENCE R. CLEVELAND, OF HOMEWOOD, ILLINOIS, ASSIGNOR TO STANDARD OIL COMPANY, OF CHICAGO, ILLINOIS, A CORPORATION OF INDIANA

INSECT REPELLENT

No Drawing.   Application filed July 10, 1929. Serial No. 377,333.

This invention relates to improvements in preparations which are applied to the skin to repel attacks by biting insects, in particular flies, mosquitos, and which are hereinafter referred to as "insect repellents". One of the objects of the invention is to provide an insect repellent which will have a mild and agreeable odor. Another object is to provide a material with improved lasting power. Substances which have been used heretofore for this purpose have been strong smelling oils such as the oils of pennyroyal, citronella and wintergreen, the common belief being that a strong and disagreeable odor was necessary to discourage insect attack. Furthermore, as is usually the case with highly odoriferous substances, these oils are possessed of a relatively high degree of volatility.

I have now discovered that mosquito repellents can be made, which are neither strongly odorous nor highly volatile. In fact, I have discovered a group of compounds which have a very slight odor and a low volatility, but which surpass in effectiveness any of the previously known repellents. Furthermore, because of their lower volatility, these compounds do not evaporate as rapidly from the skin as do substances which have been previously used as repellents. Consequently, their period of effectiveness is much longer than that of any of the previously known repellents.

I have also discovered that the esters of salicylic acid are peculiarly effective in repelling insects, and are, at the same time, non-injurious to the skin. The esters of salicylic acid with the high boiling alcohols combine both the properties of low volatility and high insect-repelling potency which makes them especially adapted to be used in insect repellent preparations. The higher the boiling point of the alcohol combined in the ester, the lower will be the volatility of the ester. Practically, it is not desirable to use esters of alcohols containing less than four carbon atoms, because the resultant esters are too volatile. Preparations made from these substances give protection against insect attack for longer periods of time than can be obtained with any preparation known to the art. Furthermore, these high boiling esters, partly because of their low volatility, possess a relatively slight odor. As a consequence, they are much more agreeable to use than the strong smelling essential oils now employed.

The following compounds are representative of those which I may employ in making up my insect repellent preparations: benzyl salicylate, hexyl salicylate, butyl salicylate, and cinnamyl salicylate.

As the base of my preparation I may use an oil, cream, or other vehicle in which to dissolve or suspend the active ingredient and to assist in spreading it upon the skin. The following examples will serve to illustrate suitable preparations.

*Example I.—Mosquito repellent cream*

| | |
|---|---|
| White mineral oil about 200 seconds Saybolt viscosity at 100° F | 16 oz. |
| White beeswax | 4 oz. |
| Spermacetti | 1 oz. |
| Distilled water | 8 oz. |
| Borax | 30 gr. |
| Butyl salicylate | 1.5 oz. |

The above ingredients are thoroughly emulsified to form a cosmetic cream in the manner well known to the art, in which form the material may be easily applied to the skin.

*Example II.—Mosquito repellent liquid*

| | |
|---|---|
| White neutral oil | 95% |
| Hexyl salicylate | 5% |

The hexyl salicylate is dissolved in the oil, the resultant liquid being suitable for an insect repellent.

It will, of course, be understood that other substantially non-volatile esters of salicylic acid, such as butyl salicylate, or cinnamyl salicylate may replace hexyl salicylate in the latter example; and the proportion of the ester may be varied depending on the activity of the particular ester used and the insect repelling strength desired in the preparation. Thus I may use as little as 1 per cent by weight of hexyl salicylate in white neutral oil where only a slight repelling effect is sought, or I may use 15 per cent where I desire a preparation which will give protection for a long period of time. Furthermore, although I prefer to use mineral oils, other oils such as vegetable oil may be substituted.

Although I have given specific examples to illustrate my invention, it should be understood that these are not intended as a limitation, except as set forth in the following claims:

1. An insect repellent comprising an alkyl ester of salicylic acid, said alkyl group containing at least four carbon atoms.
2. An insect repellent comprising a butyl salicylate.
3. An insect repellent comprising a hexyl salicylate.
4. An insect repellent comprising a mixture of a refined mineral oil and an alkyl ester of salicylic acid, the alkyl group containing at least four carbon atoms.

Witness my hand this third day of July, A. D. 1929.

CLARENCE R. CLEVELAND.